United States Patent
Mastrolia (10) Patent No.: US 7,699,265 B2
(45) Date of Patent: Apr. 20, 2010

(54) AIRCRAFT EJECTION SEAT WITH MOVABLE HEADREST

(75) Inventor: Brad Mastrolia, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 153 days.

(21) Appl. No.: 12/040,095

(22) Filed: Feb. 29, 2008

(65) Prior Publication Data

US 2009/0045285 A1 Feb. 19, 2009

Related U.S. Application Data

(60) Provisional application No. 60/893,039, filed on Mar. 5, 2007, provisional application No. 60/894,636, filed on Mar. 13, 2007.

(51) Int. Cl.
*B64D 25/06* (2006.01)

(52) U.S. Cl. .................. 244/122 AG; 244/122 A; 297/216.14

(58) Field of Classification Search ............ 244/122 AG, 244/122 A, 122 AB; 297/216.14, 216.12
See application file for complete search history.

(56) References Cited

U.S. PATENT DOCUMENTS

| | | | |
|---|---|---|---|
| 2,920,848 A | 1/1960 | Bohlin | |
| 3,334,847 A * | 8/1967 | Axenborg | 244/122 A |
| 3,645,259 A | 2/1972 | Schulman | |
| 3,981,465 A * | 9/1976 | Sinnett et al. | 244/122 A |
| 4,436,262 A | 3/1984 | Cummings | |
| 4,466,662 A | 8/1984 | McDonald et al. | |
| 4,667,901 A * | 5/1987 | Herndon | 244/122 AC |
| 4,899,961 A | 2/1990 | Herndon | |
| 5,039,035 A * | 8/1991 | Fitzpatrick | 244/122 AG |
| 6,315,245 B1 | 11/2001 | Ruff | |
| 6,422,513 B1 * | 7/2002 | Lewis et al. | 244/122 AG |
| 6,692,071 B2 * | 2/2004 | Fowler | 297/216.12 |
| 6,938,953 B2 * | 9/2005 | Håland et al. | 297/216.14 |
| 7,097,242 B2 * | 8/2006 | Farquhar et al. | 297/216.12 |
| 7,604,080 B2 * | 10/2009 | Breed | 180/274 |

FOREIGN PATENT DOCUMENTS

| | | |
|---|---|---|
| EP | 1038770 A1 | 9/2000 |
| GB | 2373169 A | 5/2002 |
| JP | 1-1262296 A | 10/1989 |

* cited by examiner

*Primary Examiner*—Christopher P Ellis
(74) *Attorney, Agent, or Firm*—Jerry J. Holden; John D. Titus (57) ABSTRACT

An ejection seat includes a headrest that, upon initiation of the ejection seat, moves forward to support the pilot's head in a tilted-forward position. By holding the crewmember's head in a tilted-forward position, windblast forces are controlled to prevent the helmet from pulling upward and backward on the crewmember's head. The headrest may include a pair of struts that extend forward around the sides of the crewmember's helmet to support the crewmember's head against flailing from the windblast. A flexible panel extending between the struts and the headrest panel may also be included to further support the crewmember's head against windblast flailing.

20 Claims, 7 Drawing Sheets

AIRCRAFT EJECTION SEAT WITH MOVABLE HEADREST

CROSS-REFERENCE TO RELATED APPLICATIONS

The application claims priority of provisional application Nos. 60/893,039 filed Mar. 5, 2007 and 60/894,636 filed Mar. 13, 2007.

BACKGROUND OF THE INVENTION

This invention relates to aircraft interior equipment, and more particularly, to aircraft ejection seats.

When a pilot or other aircraft occupant ejects from an aircraft moving at high speed, his or her body is subjected to various acceleration and aerodynamic conditions that if not properly controlled may lead to injury. One area of particular concern is the crewmember's head and neck. During the initial acceleration of the ejection seat, acceleration forces acting on the crewmember's head and helmet tend to pitch the crewmember's head forward and down, this effect is especially pronounced if the helmet is equipped with night vision and/or heads-up-display equipment mounted forward of the crewmember's face. Next, aerodynamic flow over the top of the helmet causes a large pressure drop to occur so that the normal pressure inside the helmet acts to pull the helmet upward, jerking the crewmember's head up and back from its previous tilted-forward position. After the seat has cleared the aircraft, aerodynamic forces acting on the helmet and ejection seat may interact to cause the crewmember's head to flail in the windblast.

U.S. Pat. No. 3,645,259 to Schulman discloses an inflatable airbag positioned beneath the pilot's chin that inflates during ejection. This approach addresses the problem of the crewmember's head tilting forward upon initial acceleration but does not address the aerodynamic lift and flailing problems associated with high-speed ejection. U.S. Pat. No. 4,899,961 to Herndon discloses a headrest having inflatable lateral restraints. This approach addresses the problem of the crewmember's head flailing in the windblast but does not address the tilt-forward or aerodynamic lift issues. U.S. Pat. No. 4,436,262 to Cummings discloses a wind blast head protector in the form of a canopy that deploys over the top of the crewmember's helmet. This approach addresses the problem of the crewmember's helmet lifting off the crewmember's head and purports to address the issue of head flailing in the wind blast, but does not address the problem of the crewmember's head tilting forward and jerking back as acceleration forces give way to wind blast forces and may impede the crewmember's separation from the seat when the crewmember's parachute deploys.

SUMMARY OF THE INVENTION

The present invention overcomes the problems associated with the prior art by providing an ejection seat with a headrest that deploys to support the crewmember's head against acceleration and aerodynamic forces to prevent the pilot's head from being jerked upward or flailed by the acceleration and wind blast forces. According to an illustrative embodiment, the ejection seat comprises a headrest that, upon initiation of the ejection seat, moves forward to support the pilot's head in a tilted-forward position. By holding the crewmember's head in a tilted-forward position, windblast forces are controlled to prevent the helmet from pulling upward and backward on the crewmember's head. Additionally, moving the headrest forward limits the distance the crewmember's head can move backwards in the windstream, thereby further controlling head impact loads. The headrest may include a pair of struts that extend forward around the sides of the crewmember's helmet to support the crewmember's head against flailing from the windblast. A flexible panel extending between the struts and the headrest panel may also be included to further support the crewmember's head against windblast flailing.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

The drawing figures are intended to illustrate to the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

Figure 1:
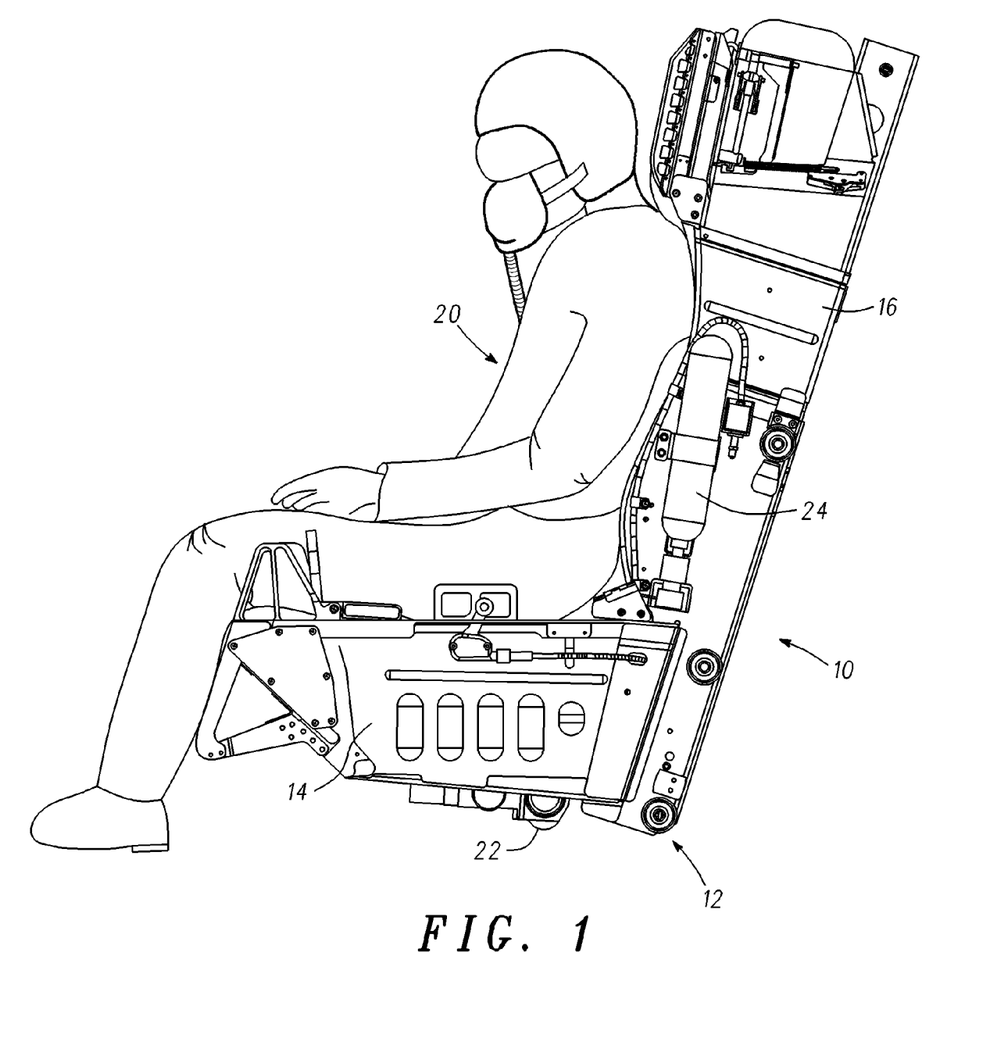
FIG. 1 is a side view of an illustrative embodiment of an ejection seat incorporating features of the present invention.
Figure 2:
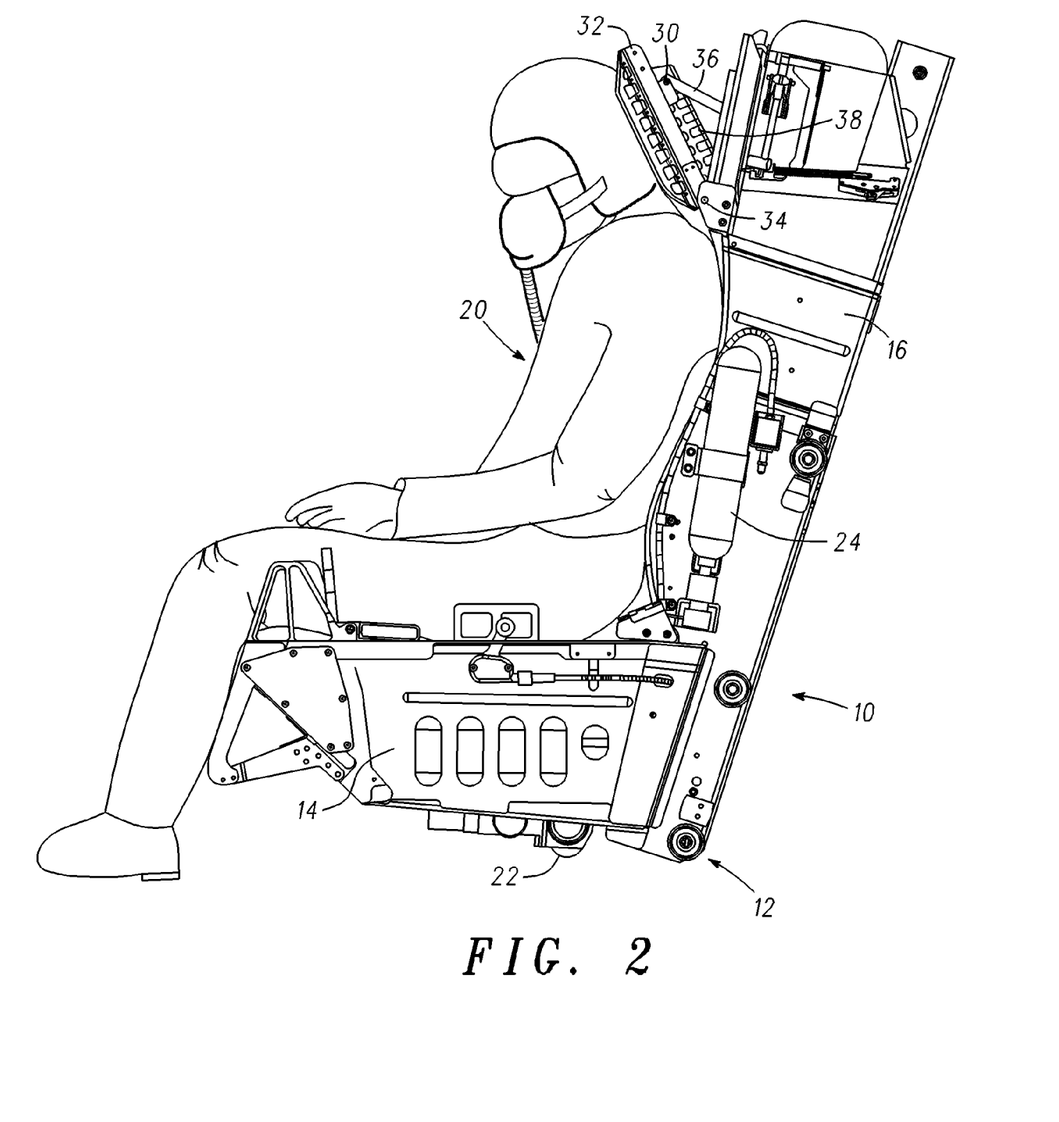
FIG. 2 is a side view of ejection seat of FIG. 1 with the headrest panel deployed.
Figure 3:
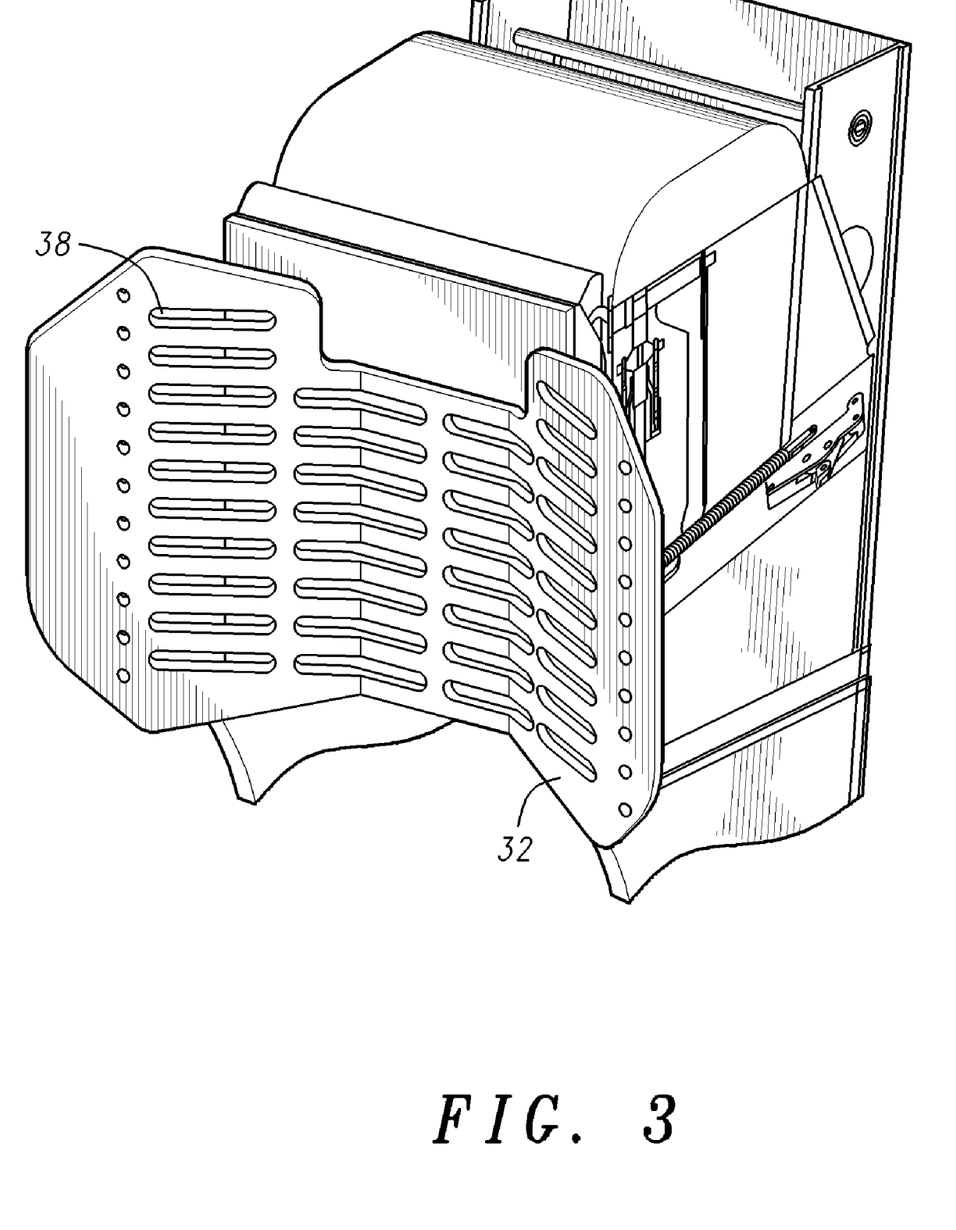
FIG. 3 is a front perspective view of the upper portion of the ejection seat of FIG. 1.

With references to FIGS. 1-3, an ejection seat 10 incorporating features of the present invention comprises a seat frame 12 consisting of a seat portion 14 and a back portion 16 adapted to support an aircraft occupant such as pilot 20. Ejection seat 10 is equipped with a propulsion subsystem typically consisting of a catapult and a rocket motor 22 for propelling the seat frame free of the aircraft in response to an eject signal. Ejection seat 10 is further equipped with a remote oxygen supply 24 inertial reels (not shown) and other features associated with ejection seats well known in the art.

As with state of the art ejection seats, upon receipt of an eject signal (initiated by pilot command or based on an algorithm operating in one of the aircraft's computers) the ejection seat's propulsion subsystem is initiated to accelerate the ejection seat and its occupant quickly out of the aircraft. As noted hereinbefore, this initial acceleration acting on the mass of the crewmember's head and helmet cause the crewmember's head to tilt forward and downward. If the crewmember's head is not protected, subsequent exposure to the wind blast upon exiting the aircraft will cause the crewmember's head to be jerked upward with a force exceeding 400 pounds with the potential for causing serious injury to the crewmember. Various prior art approaches have attempted to limit the potential for injury caused by the crewmember's head tilting forward then jerking upward by attempting to prevent the crewmember's head from tilting forward in the first place, e.g., by inflating a pad underneath the crewmember's chin or attaching lanyards to the crewmember's helmet that retract during ejection, both with limited success. What the inventor of the present invention determined was the aerodynamic forces tending to jerk the crewmember's helmet up could be more practically controlled by maintaining the crewmember's helmet in the tilted-forward position rather than trying to prevent the head tilt. Accordingly, the ejection seat 10 includes a movable headrest 30 that deploys from a stowed position as shown in FIG. 1 to a deployed position as shown in FIG. 2 to support the crewmember with his/her head tilted forward at least 10 degrees, preferably 10-60 degrees measured relative to the torso. In the illustrative embodiment of FIGS. 1-3, the flat portion of the headrest panel tilts forward 25-45 degrees relative to the longitudinal axis of the seat back, preferably about 35 degrees to hold the crewmember's head in a tilted forward orientation between 30-40 degrees or about 35 degrees relative to the torso. As can be seen in FIGS. 1 and 2, the crewmember's torso remains in contact with back portion 16 of seat frame 12. The inertial reels (not shown) may be employed to restrain the crewmember's torso against the seat back in a manner well-known in the art.

In the illustrative embodiment of FIGS. 1-3, the movable headrest comprises a rigid headrest panel 32 that is pivotably attached by means of a hinge 34 to back portion 16 of seat frame 12. Upon receipt of an eject signal, headrest panel 32 deploys rapidly (less than 500 milliseconds, preferably 20 to 200 milliseconds and most preferably about 100 milliseconds) from the stowed position to the deployed position. As can be seen from FIG. 3, headrest panel 32 is substantially cup-shaped and includes a plurality of louvers 38. The cup-shape helps to cradle the crewmember's head and the louvers 38 prevent a build up of high pressure around headrest panel 32. Both of these features are designed to reduce the aerodynamic forces tending to cause the crewmember's head to flail in the windblast. Additionally, moving the headrest forward limits the distance the crewmember's head can move backwards in the windstream, thereby further controlling head impact loads.

Figure 4:
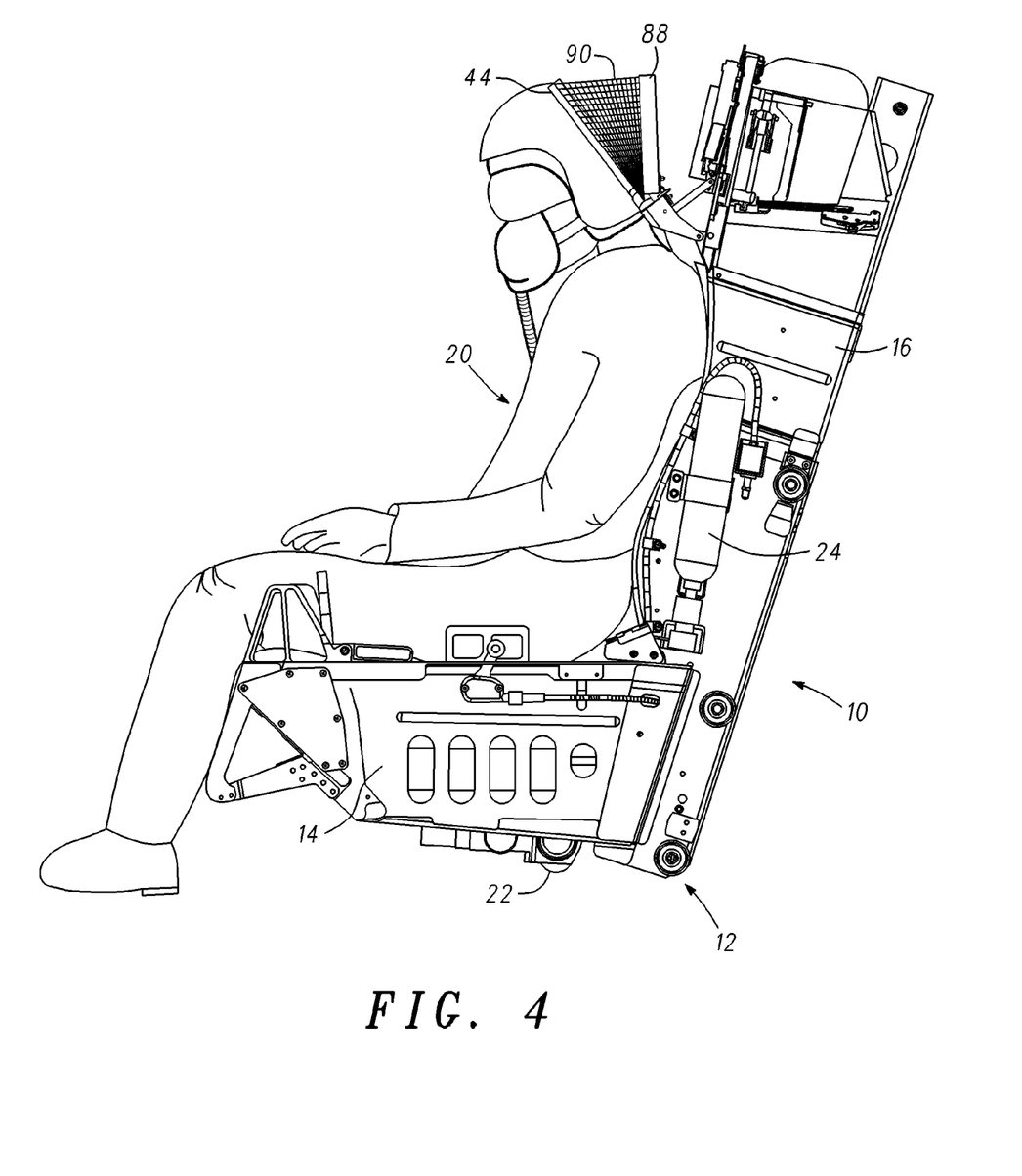
FIG. 4 is a side view of an alternative embodiment of an ejection set incorporating features of the present invention.
Figure 5:
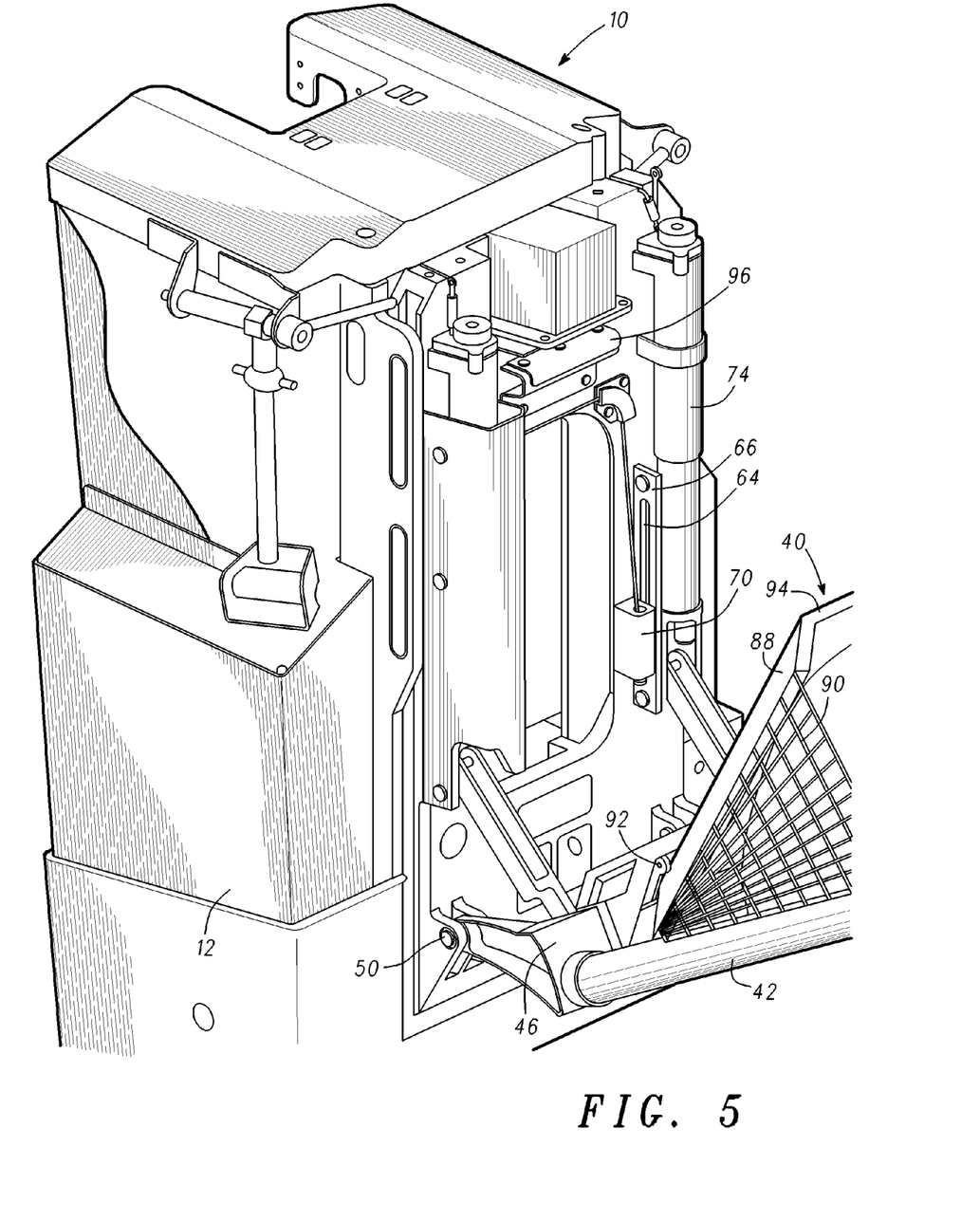
FIG. 5 is a perspective view of the upper portion of the ejection seat of FIG. 4.
Figure 6:
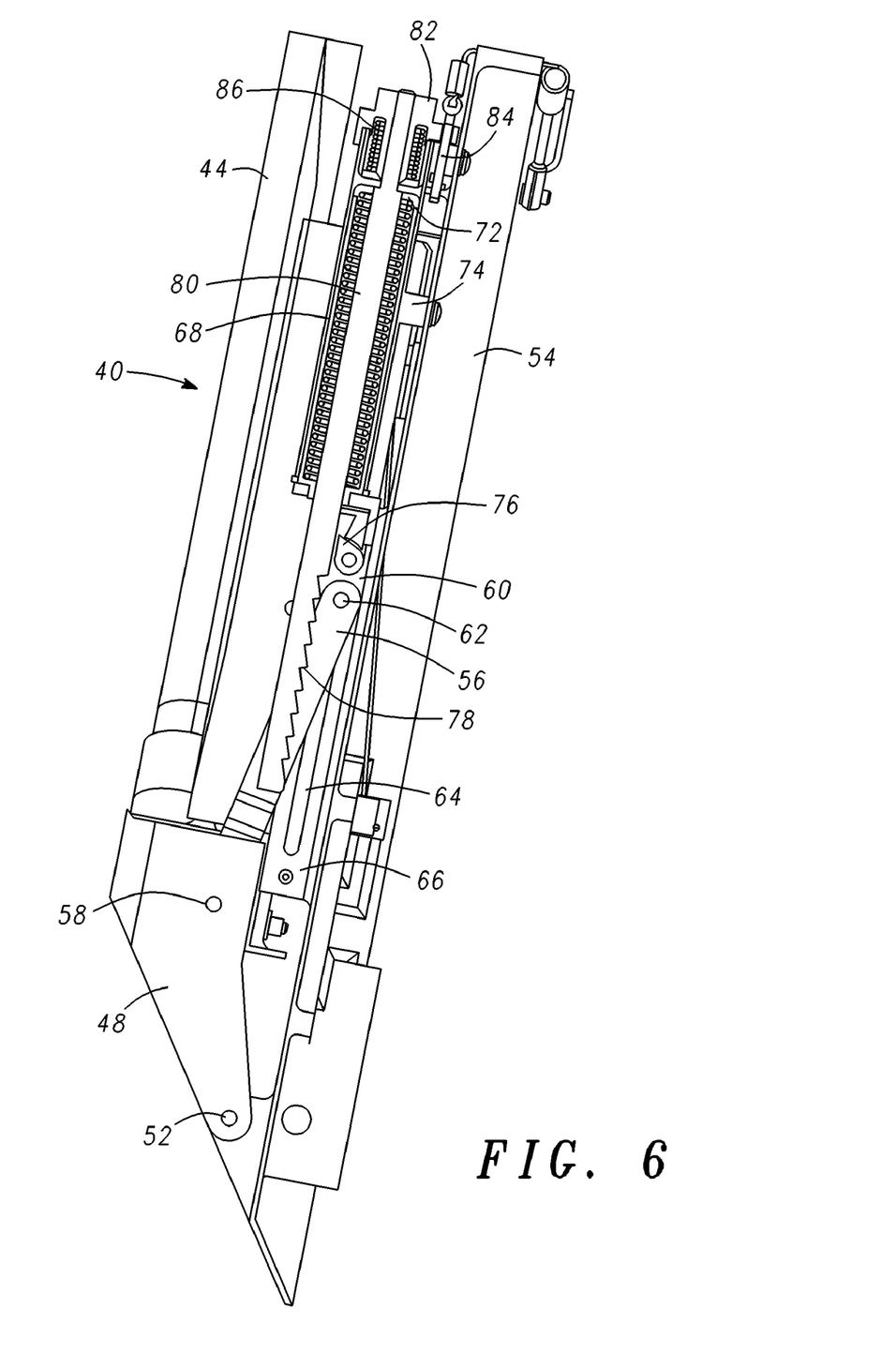
FIG. 6 is a side view of the headrest deployment mechanism of the illustrative embodiment of FIG. 4 with the headrest panel in the stowed position.
Figure 7:
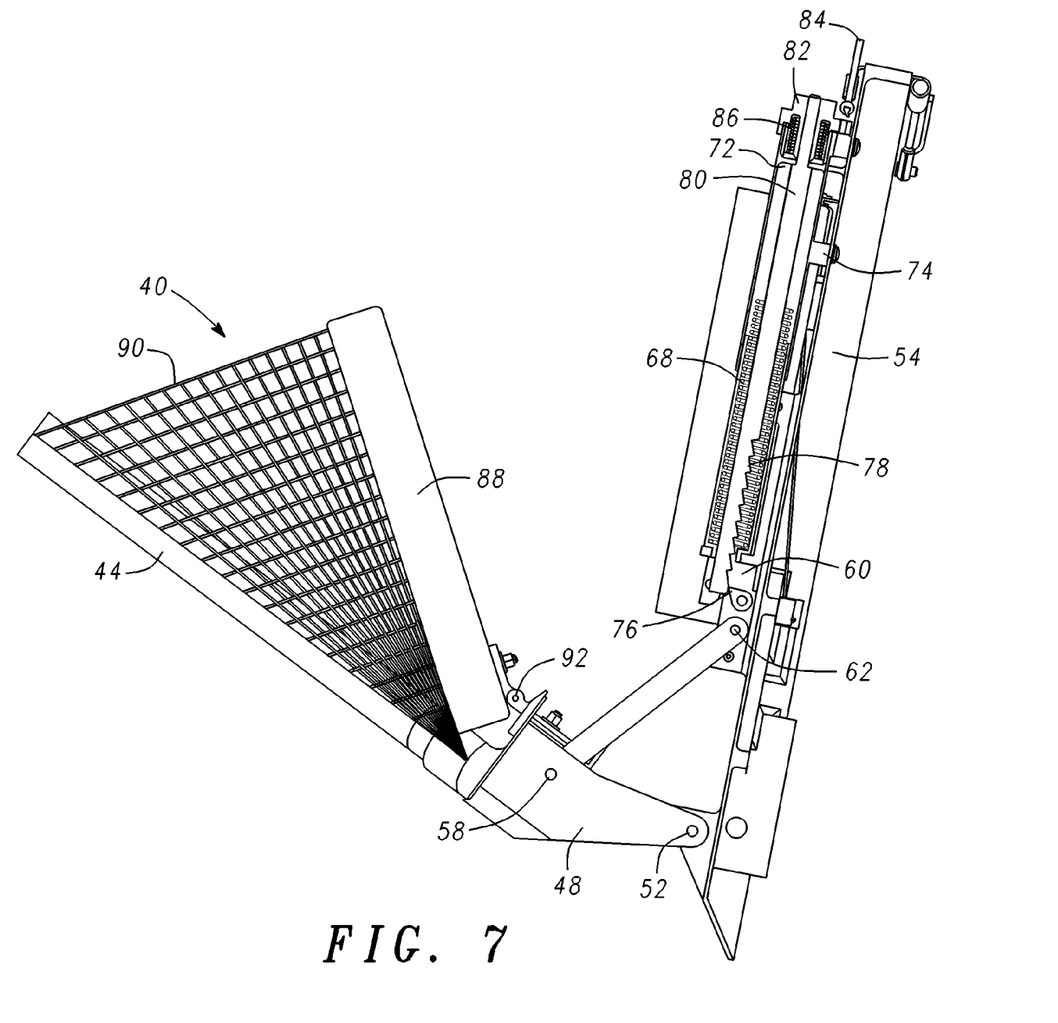
FIG. 7 is a side view of the headrest mechanism of FIG. 6 with the headrest panel in the deployed position.

With reference to FIGS. 4-6, in an alternative embodiment of an ejection seat incorporating features of the present invention, rigid headrest 30 is replaced by a movable headrest 40 that is at least partially flexible. In the embodiment of FIG. 4-6, movable headrest 40 comprises a pair of struts 42, 44 each of which is attached to a strut support 48. Strut support 48 is pivotably attached by pivots 50, 52 to a frame 54 mounted to back portion 16 of ejection seat 10.

With particular reference to FIGS. 5 and 6, strut support 48 is pivotably attached to one end of toggle link 56 by pivot 58. The other end of toggle link 56 is pivotably connected to a slider 60 by means of pivot 62. Slider 60 is adapted to slide linearly in slider track 64 formed in track frame 62 attached to frame 54. Strut support 48 toggle link 56 and slider 60 form a toggle linkage that is slightly under center when strut 44 is in its stowed position as shown in FIG. 5. Thus, when slider 60 is urged downward along slider track 64, the toggle linkage moves to a substantially under center position as shown in FIG. 6 to move strut 44 from its stowed position to its deployed position. Strut 44 is maintained in its stowed position by a release pin 70 (FIG. 4) which holds slider 60 in position against the substantial downward force of compression spring 68 which acts between slider 60 and spring seat 72 formed in spring housing 74. When release pin 70 is withdrawn in response to an eject signal, compression spring 68 forces slider 60 downward along slider track 64 thereby moving the toggle linkage formed by strut support 48 and toggle link 56 into a substantially over center position. Meanwhile a pawl 76 mounted on slider 60 engages a series of ratchet teeth formed on rack 80 to prevent strut 44 from retracting once deployed.

Rack 80 is keyed to a socket 82 which, in turn is fixed rotationally by a second release pin 84 which holds socket 82 in position against the torque of a torsion spring 86 also housed in spring housing 74. When a second signal is received indicating that the crewmember's parachute is deploying and seat separation is imminent, release pin 84 is withdrawn, which allows torsion spring 86 to rotate rack 80 so that ratchet teeth 78 no longer engage pawl 76. This allows movable headrest 40 to be pushed back toward the stowed position as the crewmember separates from ejection seat 10 thereby minimizing the possibility that the crewmember's separation from ejection seat 10 would be obstructed in anyway by movable headrest 40. The mechanism that deploys strut 42 is substantially the same as the mechanism that deploys strut 44 and therefore will not be discussed in detail herein.

With particular reference to FIGS. 4 and 5, in the illustrative embodiment, a rigid headrest panel 88 is pivotably attached to strut support 48 by hinge 92, which creates a second toggle linkage consisting of headrest panel 88 and strut support 48. This second toggle linkage enables headrest panel 88 to be securely stowed in the undeployed condition with the upper edge 94 of headrest panel sliding under hook 96 as strut support 48 rotates to the stowed position. As strut support 48 rotates toward the deployed position, the upper edge 94 of headrest panel 88 slides out from under hook 96 freeing headrest panel 88. Headrest panel 88 is then pulled forward by a flexible panel 90 attached between struts 42,44 and headrest panel 88. In the illustrative embodiment, struts 42 and 44 pivot forward between 40-80 degrees, preferably 60-70 degrees and most preferably about 65 degrees to cradle the crewmember's helmet against side loads. Flexible panel 90 attached to headrest panel 88 pulls headrest panel 88 forward between 20-50 degrees, preferably between 30-40 degrees and most preferably about 35 degrees relative to the longitudinal axis of the seat back to cradle the crewmember's head against aerodynamic forces tending to jerk the crewmember's head upwards and backwards. Flexible panel 90 is preferably formed of a lightweight synthetic fabric such as nylon or polyester. In order to further reduce the possibility of aerodynamic forces causing the crewmember's head to flail in the windblast, flexible panel 90 may be a substantially open weave net, a single strap or a plurality of straps of sufficient strength to deploy headrest panel 88, while at the same time presenting minimal frontal area. The minimum frontal area of flexible panel 90 minimizes pressure buildup between the crewmember's helmet and the headrest which would otherwise cause potential helmet flailing.

Although certain illustrative embodiments and methods have been disclosed herein, it will be apparent from the foregoing disclosure to those skilled in the art that variations and modifications of such embodiments and methods may be made without departing from the spirit and scope of the invention. For example, although the means for deploying the movable headrest from the stowed position to the deployed position shown in the illustrative embodiments comprised an elastic member such as a compression spring, other means of deploying the movable headrest including pneumatic, hydro-pneumatic or electric solenoid, stepper motor, motor with slip clutch, etc. are considered to be equivalent means for deploying the headrest and therefore considered with in the scope of the invention. Additionally, although in the illustrative embodiment the headrest panel pivots forward, any movable headrest that deploys in response to the eject signal to retain the crewmember's head in a tilted-forward position, such as a linear actuator or cylinder extending forward from the back portion of the seat frame forward of the seat cushion is considered an equivalent means and therefore within the scope of the invention. Similarly, although in the illustrative embodiment the flexible panel is attached to a rigid headrest panel, a fully flexible panel that extended between the struts is considered to be an equivalent headrest and therefore is considered within the scope of the invention. Finally, although the means for locking the movable headrest in its deployed position shown in the illustrative embodiment comprised a ratchet and pawl, other means for preventing the headrest from retracting towards its stowed position such as ball detents, over center links, self-locking gear ratios, torque-limiting clutches, stepper motors, etc. are considered to be equivalent means and therefore within the scope of the present invention. Accordingly, it is intended that the invention shall be limited only to the extent required by the appended claims and the rules and principles of applicable law.

What is claimed is:

1. An ejection seat for an aircraft comprising:
   a seat frame for supporting an aircraft occupant, said seat frame including a seat portion and a back portion;
   a propulsion subsystem for propelling the seat frame free of the aircraft in response to an eject signal; and
   a moveable headrest attached to the back portion of said seat frame, said moveable headrest comprising a headrest panel that, in response to said eject signal, extends forward from a stowed position rearward of the occupant's head, to a forwardly extended position to support the rear of the occupant's head in a tilted-forward position relative to the occupant's torso, the moveable headrest including a plurality of air passages extending from a forward surface of the moveable headrest to a rear surface of the moveable headrest, the plurality of air passages operating to prevent a build up of high pressure around the forward surface of the moveable headrest as said moveable headrest is exposed to a windblast.

2. The ejection seat of claim 1, wherein:
   said back portion of said seat frame includes a seat back cushion having a forward surface for supporting the aircraft occupant; and
   said stowed position of said headrest panel comprises said headrest panel being substantially behind a plane defined by the forward surface of the seat back cushion, and said deployed position comprises said headrest panel extending forward of the plane defined by the forward surface of the seat back cushion to support the occupant's head with the occupant's head tilted forward at least 10 degrees.

3. The ejection seat of claim 1, wherein:
   the headrest panel supports the occupant's head with the occupant's head tilted forward from 10-70 degrees.

4. The ejection seat of claim 1, wherein:
   the moveable headrest includes deployable side members that move to extend partially around the occupant's head to support the occupant's head against lateral forces.

5. The ejection seat of claim 1, wherein:
   the headrest panel comprises a flexible member supported at opposite ends by a pair of struts, each of said pair of struts extending generally vertically upward from a pivot attached to said back portion of said seat frame, said pair of struts pivoting forward to extend said flexible member panel from the stowed position to the deployed position.

6. The ejection seat of claim 5, wherein:
   the flexible member is attached to a substantially rigid headrest panel, the flexible member urging the substantially rigid headrest panel from the stowed position to the deployed position.

7. A moveable headrest for an ejection seat having a seat frame, said seat frame comprising a seat portion and a back portion adapted to support an aircraft occupant, said moveable headrest comprising:
   first and second rigid struts extending generally vertically upward from a pivot attached to said back portion, said pair of struts adapted to pivot forward to at least partially surround an occupant's head;
   a headrest panel attached to said first and second rigid struts by at least one flexible member, the at least one flexible member defining at least one air passage between the rigid struts and the headrest panel for allowing air to pass from a front surface of the moveable headrest to a rear surface of the moveable headrest whereby the at least one air passage operates to prevent a build up of high pressure around the forward surface of the moveable headrest as the moveable headrest is exposed to a windblast;
   first means for urging said moveable headrest into a fixed deployed position in which said first and second rigid struts at least partially surround the lateral sides of the occupant's head to support the occupant's head against side loads and said headrest panel engages a rear portion of the occupant's head to support the occupant's head in a tilted-forward position relative to the occupants torso, said first means responsive to an eject signal to urge said moveable headrest from said stowed position to said deployed position.

8. The moveable headrest of claim 7, further comprising:
   second means for locking said headrest panel in said deployed position to prevent said headrest panel from retracting toward the stowed position.

9. The moveable headrest of claim 8, wherein:
   the first means comprises an elastic member operatively attached between said headrest panel and said seat frame.

10. The moveable headrest of claim 9, wherein:
    said first means further comprises a linkage connecting said elastic member to said headrest panel.

11. The moveable headrest of claim 10, wherein:
    said elastic member is stored in a compressed position and first means further comprises a retaining member that is released in response to the eject signal to allow said elastic member to expand to move said moveable headrest.

12. The moveable headrest of claim 8, wherein:
    said second means comprises a ratchet and pawl.

13. The moveable headrest of claim 8, further comprising:
    means responsive to a signal indicative of parachute deployment to release said second means and allow said headrest panel to retract toward the stowed position.

14. A method of ejecting an aircraft occupant wearing a helmet from an aircraft comprising:
    providing an ejection seat frame having a propulsion subsystem for propelling the ejection seat free of the aircraft in response to an eject signal;
    providing a moveable headrest mounted to the seat frame, the moveable headrest comprising a pair of rigid struts and a center member supported between the pair of rigid struts;
    in response to the eject signal, initiating the propulsion subsystem which exposes the occupant to a vertical acceleration causing the occupant's head to assume an acceleration-induced tilted forward position; and in response to the eject signal, moving the moveable headrest to a deployed position in which the rigid struts extend forward at least partially around the occupant's helmet while the center member extends forward to engage a rear surface of the occupant's helmet with the occupant's head remaining in the acceleration-induced tilted forward position.

15. The method of claim 14, wherein:

the moveable headrest moves from the stowed position to the deployed position in 500 milliseconds or less.

16. The method of claim 14, further comprising:

deploying the rigid struts forward at an angle of between 40-80 degrees to support the occupant's head against side loads.

17. The method of claim 14, further comprising:

in response to a signal indicative of parachute deployment, releasing said moveable headrest to allow said moveable headrest to move toward the stowed position.

18. The method of claim 14, wherein:

the center member is attached to the rigid struts by at least one flexible member, the at least one flexible member defining at least one air passage between the rigid struts and the center member for allowing air to pass from a front surface of the moveable headrest to a rear surface of the moveable headrest whereby the at least one air passage operates to prevent a build up of high pressure around the forward surface of the moveable headrest as the moveable headrest is exposed to a windblast.

19. The ejection seat of claim 5, wherein:

the flexible member comprises a substantially open weave net attaching the headrest panel to the pair of struts.

20. The ejection seat of claim 5, wherein:

the flexible member comprises a single strap attaching the headrest panel to each of the pair of struts.

\* \* \* \* \*